United States Patent
Buchhop et al.

(10) Patent No.: US 8,700,066 B1
(45) Date of Patent: Apr. 15, 2014

(54) IDENTIFYING LOCATION OF INDIVIDUALS ON A PREDEFINED LIST

(75) Inventors: Peter K. Buchhop, Cary, IL (US); Glenn Russell Rodbarry, Roselle, IL (US)

(73) Assignee: Bank of America Corporation, Charlotte, NC (US)

( * ) Notice: Subject to any disclaimer, the term of this patent is extended or adjusted under 35 U.S.C. 154(b) by 643 days.

(21) Appl. No.: 12/478,842

(22) Filed: Jun. 5, 2009

(51) Int. Cl.
*H04W 24/00* (2009.01)

(52) U.S. Cl.
USPC .............. 455/456.3; 455/404.1; 455/404.2; 455/414.3; 455/457

(58) Field of Classification Search
USPC .................. 455/404.1, 440, 456.1–457, 455/414.1–414.4; 379/45
See application file for complete search history.

(56) References Cited

U.S. PATENT DOCUMENTS

| | | | | |
|---|---|---|---|---|
| 5,978,928 | A * | 11/1999 | Rust ............................ | 713/502 |
| 6,973,322 | B2 * | 12/2005 | Buchmann et al. ........ | 455/456.3 |
| 7,577,420 | B2 * | 8/2009 | Srinivasan et al. ......... | 455/404.1 |
| 8,036,634 | B2 * | 10/2011 | DiMeo et al. .............. | 455/404.1 |
| 8,229,392 | B2 * | 7/2012 | Bumiller et al. ........... | 455/404.1 |
| 8,331,899 | B2 * | 12/2012 | Broms ........................ | 455/404.1 |
| 8,417,210 | B2 * | 4/2013 | Tomer ........................ | 455/404.1 |
| 8,472,987 | B2 * | 6/2013 | Bhatnagar .................. | 455/466 |
| 8,521,122 | B2 * | 8/2013 | Scott et al. ................. | 455/404.1 |
| 2004/0119755 | A1 * | 6/2004 | Guibourge ................... | 345/827 |
| 2004/0166879 | A1 * | 8/2004 | Meadows et al. .......... | 455/456.1 |
| 2006/0286961 | A1 * | 12/2006 | Levitan ...................... | 455/404.2 |
| 2006/0288119 | A1 * | 12/2006 | Kim et al. ................... | 709/238 |
| 2007/0087726 | A1 * | 4/2007 | McGary et al. ............ | 455/404.1 |
| 2007/0243880 | A1 * | 10/2007 | Gits et al. ................... | 455/456.1 |
| 2008/0004038 | A1 * | 1/2008 | Dunko ........................ | 455/456.1 |
| 2008/0013484 | A1 * | 1/2008 | Chang et al. ............... | 370/328 |
| 2009/0327302 | A1 * | 12/2009 | Richardson et al. ........ | 707/10 |
| 2010/0240337 | A1 * | 9/2010 | DiMeo et al. .............. | 455/404.1 |
| 2012/0282887 | A1 * | 11/2012 | Khoo et al. ................ | 455/404.2 |
| 2013/0012155 | A1 * | 1/2013 | Forstall et al. ............. | 455/404.2 |
| 2013/0023228 | A1 * | 1/2013 | Watson et al. ............. | 455/404.1 |

* cited by examiner

*Primary Examiner* — Sharad Rampuria
(74) *Attorney, Agent, or Firm* — Banner & Witcoff, Ltd.; Michael A. Springs

(57) ABSTRACT

Systems and methods of transmitting a message and/or a location request to individuals identified on an emergency contact list. In some arrangements, a message and/or location request may be transmitted from a first mobile device to a plurality of other mobile devices associated with individuals identified in the emergency contact list. The location of each mobile device is determined and transmitted to the first mobile device where the location information is stored and may be displayed, for instance, on a map. The systems and methods described herein may be independent of any technical infrastructure associated with the organization or business maintaining the emergency contact list. That is, a company may generally rely on systems independent of their own, such as public cellular networks, and the like, for operation of the systems and methods described herein.

21 Claims, 8 Drawing Sheets

US 8,700,066 B1

IDENTIFYING LOCATION OF INDIVIDUALS ON A PREDEFINED LIST

BACKGROUND

In today's business world it is important to have emergency response plans for varying levels of emergencies. Although organizations including corporations, financial institutions, and the like put considerable resources, and the like into ensuring that their systems will continue to run through any type of crisis, it is advisable to have one or more contingency plans in case systems do not run as expected.

Additionally, organizations often need to contact and/or locate individuals in an emergency who have desirable skills in order to return the organization to normal operating conditions. Accordingly, it would be advantageous to have systems and methods in place to contact and/or locate individuals who may be needed in a crisis using systems that do not rely on operation of the organization's systems. For instance, the ability to contact various individuals using systems operated independently of the organization may be beneficial.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this disclosure relate to systems and methods of transmitting a message and/or a location request to individuals identified on an emergency contact list. The systems and methods may include transmitting, from a first mobile device, a request for a location of at least a second mobile device associated with an individual identified in a contact list and determining, at the second mobile device, the location of the second mobile device. The systems and methods may further include transmitting the location of the second mobile device to the first mobile device and storing, on the first mobile device, the received location. In some arrangements, the systems and methods may include displaying, at the first mobile device, the stored location of the second mobile device.

Aspects of this disclosure further relate to systems and methods that may include receiving, at a plurality of mobile devices, a request for a location of each of the mobile devices, each of the mobile devices being associated with a predetermined contact list. The systems and methods may further include requesting, at the plurality of mobile devices, the location of each of the mobile devices and transmitting the received location of each of the mobile devices to a lead mobile device, the lead mobile device being associated with the predetermined contact list lead. The systems and methods may further include storing, at the lead mobile device, the received location of each of the mobile devices and displaying, at the lead mobile device, the received locations of at least one of the mobile devices.

BRIEF DESCRIPTION OF THE DRAWINGS

The present disclosure is illustrated by way of example and not limited in the accompanying figures in which like reference numerals indicate similar elements.

The reader is advised that the attached drawings are not necessarily drawn to scale.

DETAILED DESCRIPTION

Aspects of the present disclosure relate to systems and methods of locating individuals identified in an emergency contact list via systems outside an organization's infrastructure. For instance, the systems and methods described herein may include systems and methods of determining individuals who may be needed during various types of emergencies or crises and developing an emergency contact list containing those individuals. In the event of an emergency, a message may be sent to the individuals on the list and, additionally or alternatively, a request to locate individuals on the list may be sent. The location of one or more individuals on the list then may be sent to the requesting party in order to identify the whereabouts of the individuals on the list. In some arrangements, these systems and methods solely may rely on public networks, such as cellular networks, public location services such as global positioning systems providers, and the like such that, in the event of an organizational emergency in which an organization's systems are not functioning or not functioning properly, various messages and/or location info still may be sent and received.

Figure 1:
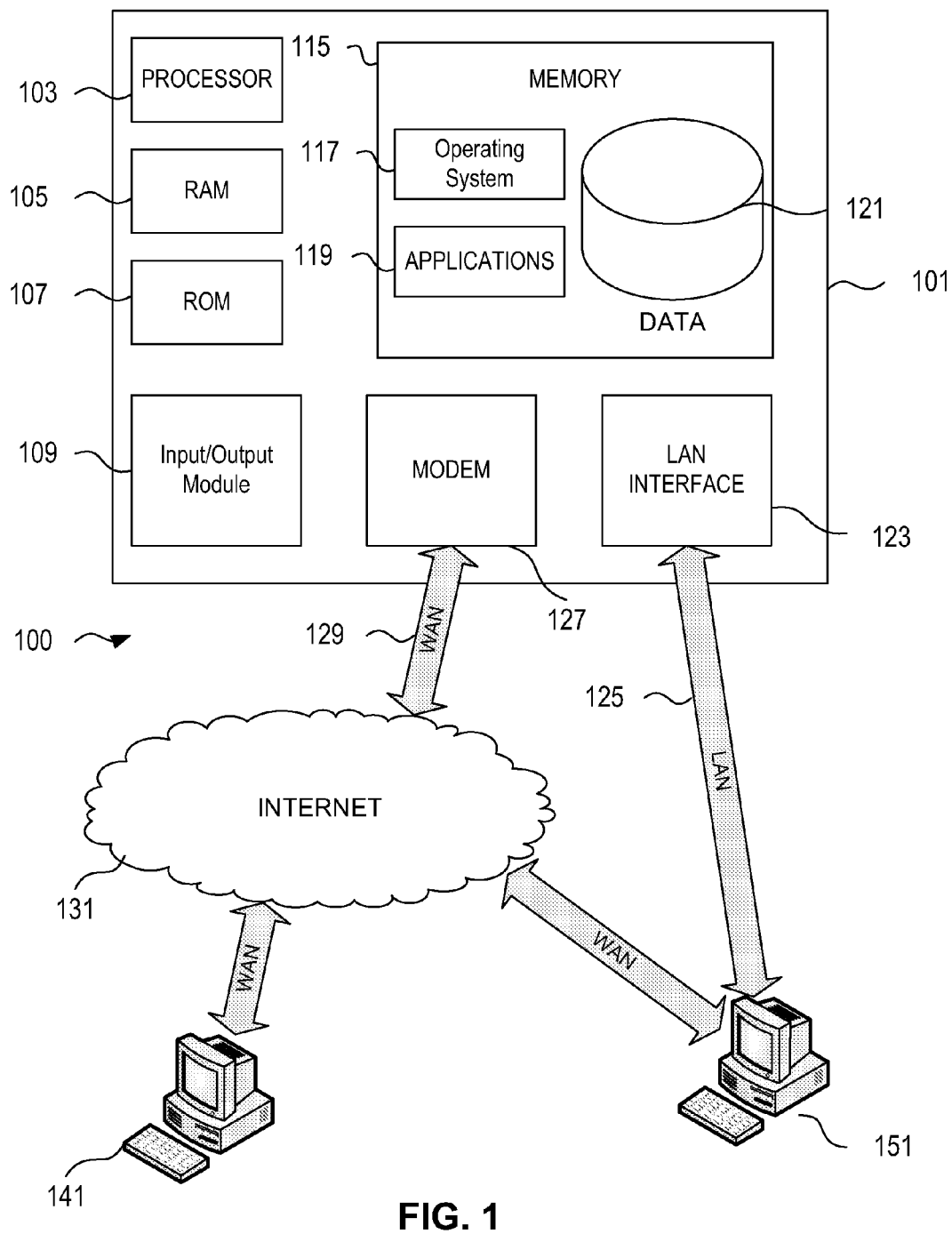
FIG. 1 illustrates an example of a suitable operating environment in which various aspects of the disclosure may be used.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including RAM 105, ROM 107, input/output module 109, and memory 115. The computing environment described herein may be used with various aspects of the systems and methods described herein.

I/O 109 may include a microphone, mouse, keypad, touch screen, scanner, optical reader, and/or stylus (or other input device(s)) through which a user of server 101 may provide input, and also may include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but also may include other networks. When used in a LAN networking environment, the computer 101 is connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 also may be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Figure 2:
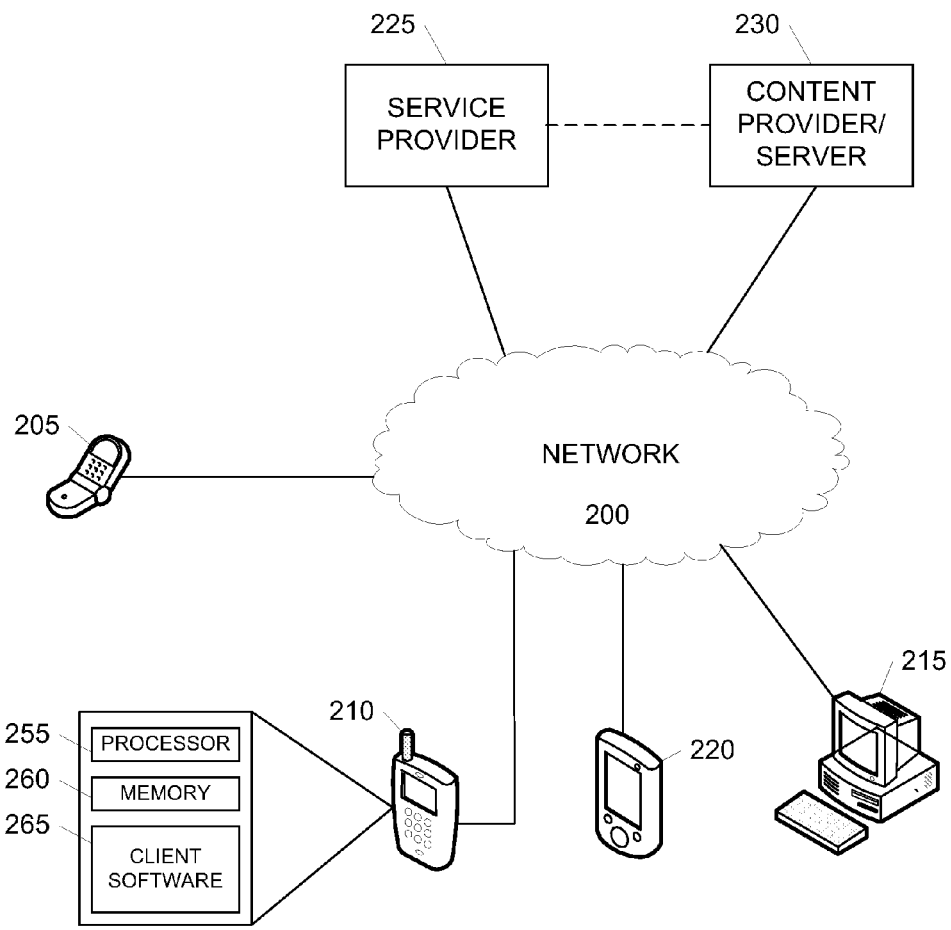
FIG. 2 illustrates an example block diagram of a system of locating various individuals via mobile devices associated with the individuals in accordance with aspects described herein.

FIG. 2 illustrates an example communication network through which various inventive principles may be practiced. A number of computers and devices including mobile communication device 205, mobile phone 210, personal digital assistant (PDA) or mobile computer 220, personal computer (PC) 215, service provider 225 and content provider 230 may communicate with one another and with other devices through network 200. Network 200 may include wired and wireless connections and network elements, and connections over the network may include permanent or temporary connections. Communication through network 200 is not limited to the illustrated devices and may include additional mobile or fixed devices such as a video storage system, an audio/video player, a digital camera/camcorder, a positioning device such as a GPS (Global Positioning System) device or satellite, a television, an audio/video player, a radio broadcasting receiver, a set-top box (STB), a digital video recorder, remote control devices and any combination thereof.

Although shown as a single network in FIG. 2 for simplicity, network 200 may include multiple networks that are interlinked so as to provide internetworked communications. Such networks may include one or more private or public packet-switched networks, e.g. the Internet, one or more private or public circuit-switched networks, e.g. a public switched telephone network, a cellular network configured to facilitate communications to and from mobile communication devices 205, 210 and 220, e.g. through use of base stations, mobile switching centers, and the like, a short or medium range wireless communication connection, e.g. Bluetooth®, ultra wideband (UWB), infrared, WiBree, wireless local area network (WLAN) according to one or more versions of Institute of Electrical and Electronics Engineers (IEEE) standard no. 802.11), or a high-speed wireless data network such as Evolution-Data Optimized (EV-DO) networks, Universal Mobile Telecommunications System (UMTS) networks, Long Term Evolution (LTE) networks or Enhanced Data rates for GSM Evolution (EDGE) networks. Devices 205-220 may use various communication protocols such as Internet Protocol (IP), Transmission Control Protocol (TCP), Simple Mail Transfer Protocol (SMTP) among others known in the art. Various messaging services such as Short Messaging Service (SMS) and/or Multimedia Message Service (MMS) may also be included.

Devices 205-220 may be configured to interact with each other or other devices, such as content server 230 or service provider 225. In one example, mobile device 210 may include client software 265 that is configured to coordinate the transmission and reception of information to and from content provider/server 230. In one arrangement, client software 265 may include application or server specific protocols for requesting and receiving content from content server 230. For example, client software 265 may comprise a Web browser or mobile variants thereof and content provider/server 230 may comprise a web server. Billing services (not shown) may also be included to charge access or data fees for services rendered. In one arrangement where service provider 225 provides cellular network access, e.g. acts as a wireless service provider, client software 265 may include instructions for access and communication through the cellular network. Client software 265 may be stored in computer-readable memory 260 such as read only, random access memory, writeable and rewriteable media and removable media in device 210 and may include instructions that cause one or more components—e.g., processor 255, a transceiver, and a display—of device 210 to perform various functions and methods including those described herein.

During an emergency or other important occurrence, it may be beneficial to have the ability to communicate with various individuals. For instance, in the event of an emergency, a company may have identified one or more individuals who can provide services or have desired skills to maintain company business, perform repairs, and the like during and after the emergency. The individuals and their contact information may be maintained in an emergency contact list. The emergency contact list may be stored at a central server associated with an organization, such as the business the individuals work for, and the like. Additionally or alternatively, the list may be stored on a mobile device associated with one or more individuals on the contact list, for instance, an individual identified as a contact lead. In still other arrangements, the emergency contact list may be stored on a mobile device associated with each individual identified on the emergency contact list. Development of the emergency contact list may be performed using any methods generally known in the art. For instance, the list may be created using various PC based applications. In one arrangement, the application may draw contact information, hierarchies, and the like from a corporate or other organizational directory in order to create the list of desired individuals. In other arrangements, a web-based application may be used to extract contact and/or hierarchy information from a corporate or other organizational directory in order to create the list. In still other arrangements, one or more users may create the list in, for example, a spreadsheet which then may be transferred to the mobile devices.

As mentioned above, in some arrangements, one or more individuals may be identified as a leader such that he or she may coordinate any recovery efforts. The leader may desire to contact one or more individuals on the contact list simultaneously in order to efficiently transmit messages to the individuals. In addition, it may be beneficial to identify the location of the individuals on the contact list. One further advantage is that the systems and methods of contacting the individuals on the list, as well as determining their locations, may be performed using systems and methods not relying on infrastructure of the company. That is, the system and method of communicating with the individuals and locating the individuals may rely on systems and equipment maintained by an outside source, such as a public cellular network, and the like. These systems and methods will be described more fully below.

Figure 3:
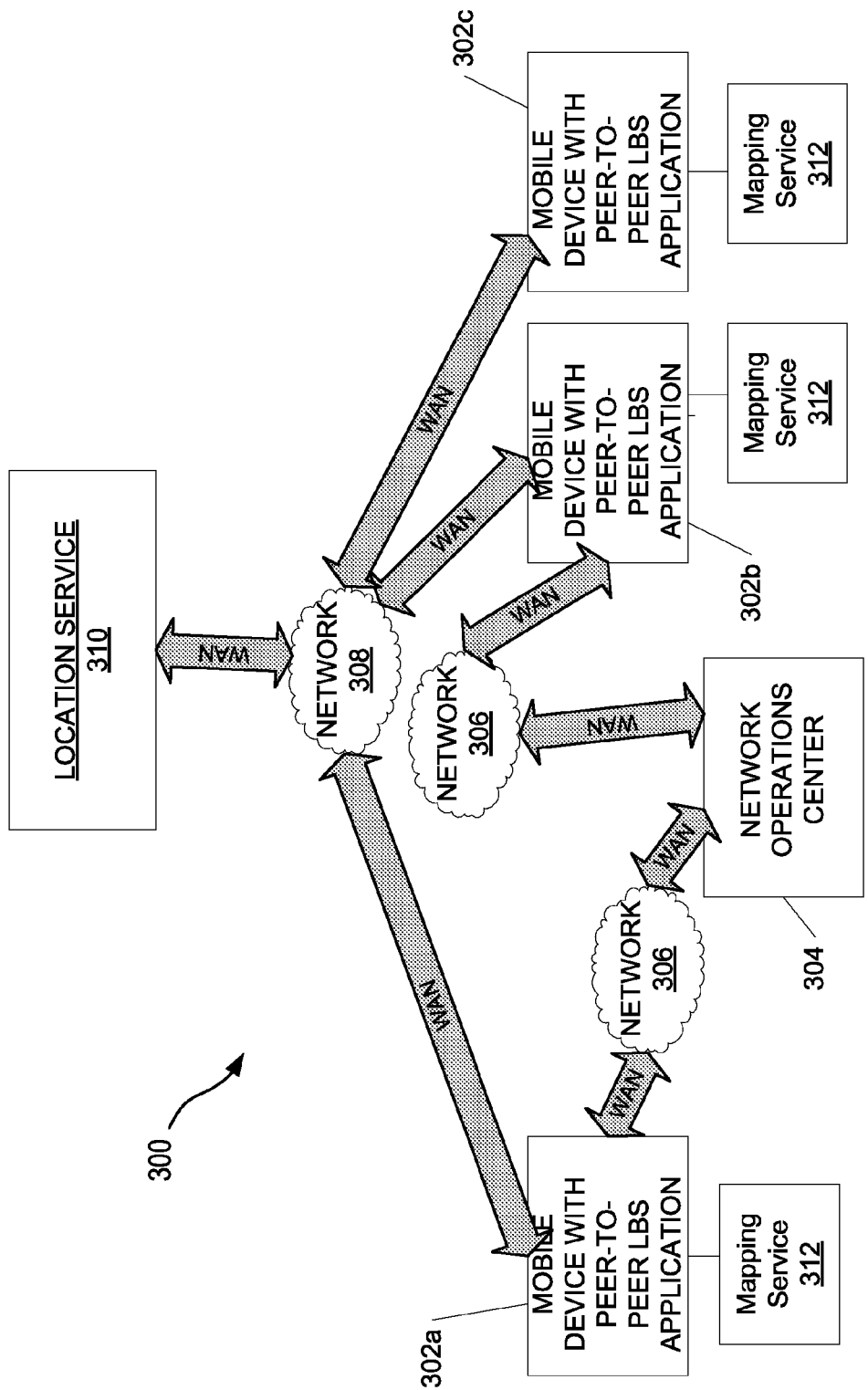
FIG. 3 is an example method of locating various individuals via mobile devices associated with the individuals in accordance with aspects described herein.

FIG. 3 is a block diagram illustrating aspects of the systems and methods described herein. The network environment 300 shown in FIG. 3 includes a plurality of mobile devices 302a-302c. In some arrangements, one mobile device may be associated with each individual identified on the emergency contact list. Additionally or alternatively, each mobile device may be configured in an identical, substantially identical or equivalent manner such that all devices will use the same or similar networks, operating systems, and the like maintain the same or similar software applications, and the like. The mobile devices 302a-302c may communicate with a network operations center 304 via one or more wireless networks 306. Additionally or alternatively, the mobile devices 302a-302c may communicate with one or more location services 310 via network 308, such as a wireless network. Networks 306 and 308 may be the same network or they may be one or more separate networks. In some arrangements, the networks 306, 308 may be of a type such as those provided by various carriers.

In some arrangements, mobile devices 302a-302c may include peer-to-peer location based service applications. These software applications may be configured to enable location of the mobile devices. In some arrangements, the user, or user's mobile device has a unique identification number, such as a pin number. The communication between mobile devices and transmission of location of the mobile devices between the devices may include identifying a pin number of the one or more devices and transmitted from identified pin number to identified pin number. In some arrangements, the pin number may be the telephone number of the mobile device, an email address associated with the user of the mobile device, and the like. In other arrangements, the pin number may be a unique alpha-numeric identifier for the mobile device that may be randomly assigned to the device.

Although three mobile devices are shown in the arrangement of FIG. 3, more or fewer mobile devices may be used. The number of mobile devices may generally be determined by the desired number of emergency contact individuals.

In some arrangements, a first mobile device 302a may request a location of other mobile devices 302b, 302c. The request may be transmitted to the other devices via network 306 and network operations center 304. The mobile devices 302b, 302c may then transmit a request for location via network 308 to location service 310. The location service 310 may include a global positioning system, cell tower triangulation, wifi base station, and the like. The location of the devices 302b, 302c may be determined and transmitted to the devices 302b, 302c. The devices may then transmit the location information to the first mobile device 302a on which the location information will be stored. In some examples, the location information may be stored only on the requesting mobile device 302a and not on the mobile devices 302b, 302c is being requested. In some arrangements, the location information may be displayed on the mobile device, for instance, via mapping service 312. Mapping service 312 may be any known mapping service and may be resident on the mobile device or may be a network based mapping service. The devices, systems, and the like described herein may, in some arrangements, be operated entirely independently of the organization using the systems and methods. That is, one advantage of the systems and methods described herein is that, in the event of an emergency affecting the organization, the organization may use these systems and methods that rely on technology supported completely independently of the organization, and, in some arrangements, are public systems used by various users including those associated with the organization and those outside the organization, to contact and/or locate individuals needed to address the emergency without relying on the systems of the organization that may have been affected by the emergency. Stated differently, in some arrangements, the systems and methods of contacting and/or locating individuals on the predefined contact list may rely solely on non-organization based systems, such as those described with respect to FIGS. 2 and 3, and might not rely on any central server and/or computing environment of the organization, such as the server and/or general computing environment described in FIG. 1.

Figure 4:
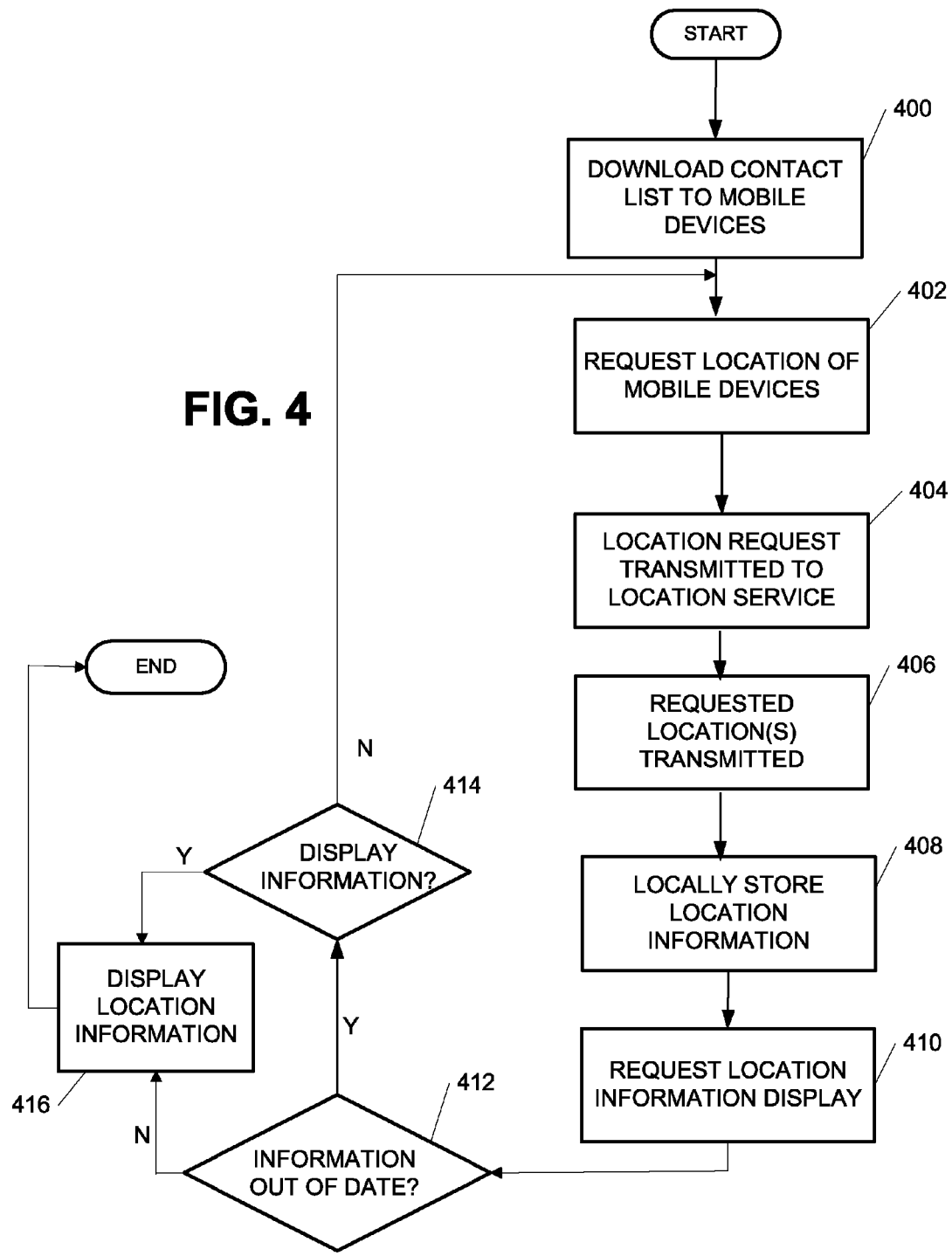
FIG. 4 illustrates one example user interface for transmitting a message and/or location request to various mobile devices in accordance with aspects described herein.

FIG. 4 illustrates one example method of determining a location of individuals on an emergency contact list. In step 400, an emergency contact list is downloaded to one or more mobile devices associated with individuals identified on the emergency contact list. In some arrangements, the mobile devices may be configured to include software, such as peer-to-peer location based services software as described herein. In step 402, a request to locate one or more individuals on the emergency contact list is transmitted, including a request to locate the mobile devices associated with the emergency contacts. The request to locate may include a transmission from a peer-to-peer location based service application on a first mobile device of the emergency contact list to one or more other mobile devices associated with the emergency contact list, for instance, via one or more networks connected to a network operations center. This request may include a request for location of one or more of the emergency contacts. In some arrangements, the request may be sent individually for each mobile device for which a location is requested. In other arrangements, one request transmission may be made for all desired mobile devices.

In step 404 the location request is transmitted from each mobile device that received the transmitted request to a location service. For instance, various global positioning system services, and the like may receive the location requests from each requesting mobile device. The location requests may be transmitted via one or more networks which may be the same network over which the location request was transmitted from the first mobile device to the receiving mobile devices. In another arrangement, the networks may be different. In step 406 the location information is transmitted from the location service to each requesting mobile device. Each mobile device then transmits the location information, as well as any desired identifying information of the contact, mobile device, and the like to the requesting mobile device, via a network connected to the network operations center. The location information for each requested mobile device may be stored locally on the requesting mobile device in step 408. A request to display the location information may be received in step 410. Upon receiving the request to display location information in step 410, a determination may be made as to whether the location information predates a predetermined threshold time, thereby rendering the location information out of date in step 412. For instance, in some arrangements, if the time stamp or date associated with the last stored location information predates the time stamp of the location request, the location information will be marked out of date and an indication may be sent to the user. If the location information is out of date, the user may choose to display the out of date information in step 414 and the information may be displayed in step 416. If the user does not choose to display the out of date location information in step 414, the user may return to step 402 to request location information.

Figure 8:
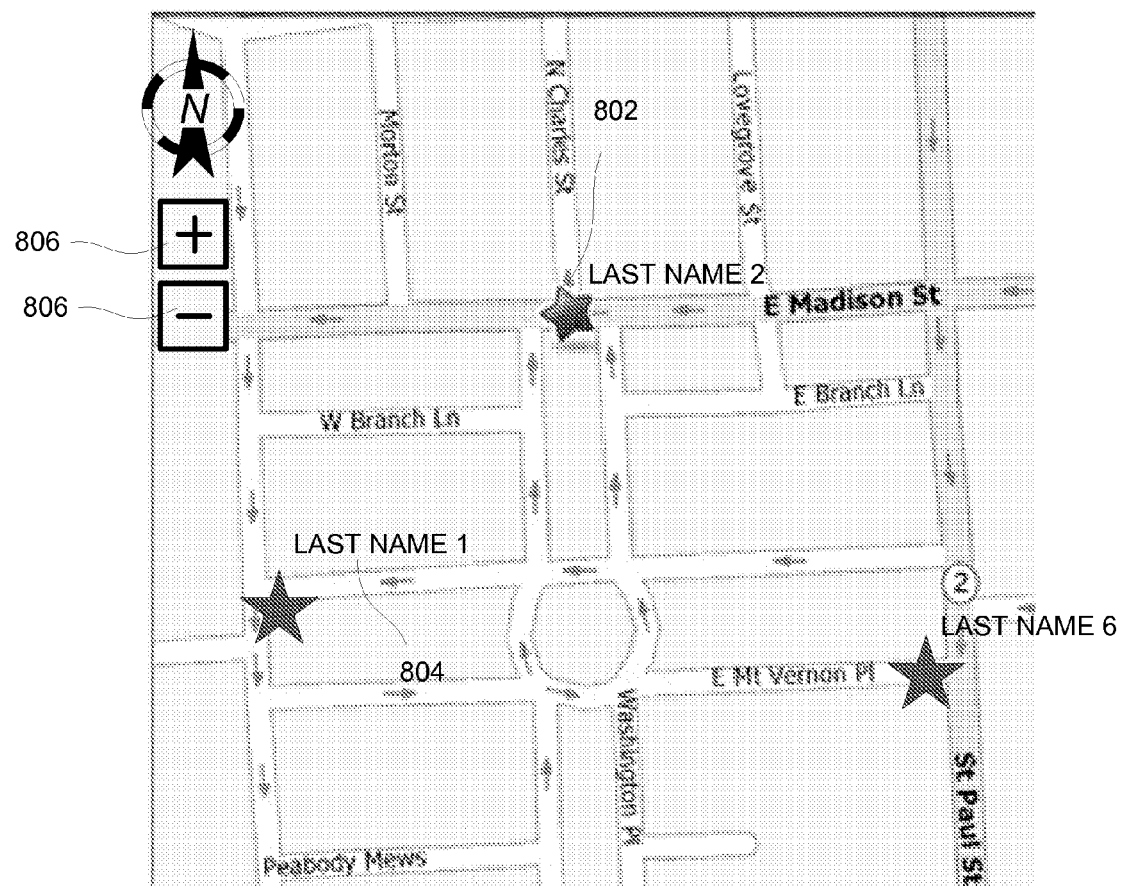
FIG. 8 illustrates one example user interface in which received locations for various mobile devices associated with individuals are displayed on a geographic map in accordance with aspects described herein.

If the location information is not out of date in step 412, the location information may be displayed in step 416. For instance, a user of the requesting mobile device may request display of locations of one or more of the requested mobile devices. The locally stored location information may then be retrieved and displayed either in a listing format and/or on a map, such as a street map as shown in FIG. 8. Creation of the map for display may be performed using a locally stored mapping service or may include use of a network based mapping service to display the location of the mobile devices. In some arrangements, the location information may be transmitted to all mobile devices associated with the contact list.

In some arrangements, once a location request and/or message is received at the mobile devices, the mobile devices may reply to the location request and/or message. That is, the mobile devices for which a location is being requested may reply to the requesting mobile device with a message, and the like. In some arrangements, any reply sent by one of the mobile devices may be transmitted to the requesting mobile device, as well as all mobile devices receiving the location request.

Figure 5:
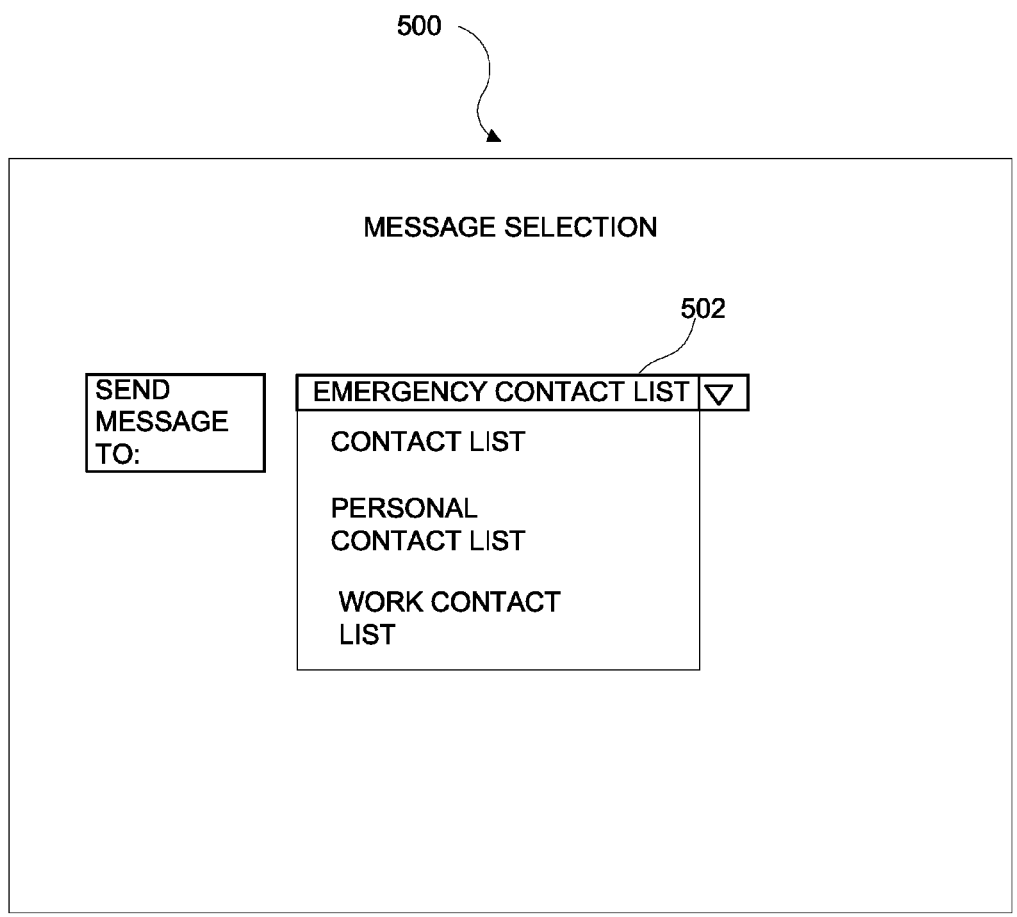
FIG. 5 illustrates an example user interface for selecting a category of individuals to whom a message and/or location request may be transmitted in accordance with aspects described herein.

FIG. 5 illustrates one example user interface 500 that may be used in conjunction with the systems and methods described herein. The message selection user interface 500 allows a user to identify a category of people to whom a message or location request may be sent. In field 502, the desired category is selected. In some arrangements, the category may be selected from a drop-down menu, as shown in FIG. 5. Other known methods of selection may also be used, such as clicking or double clicking on the desired category, selecting a radio button associated with the desired category, and the like. In some examples, user selection of a category from field 502 may automatically transmit, or prompt a user to transmit, a message to all individuals/devices associated with that category. In other arrangements, selection of a category from field 502, such as emergency contact list, will prompt a user to identify some or all of the individuals associated with the category to whom the message or location request may be sent.

Figure 6:
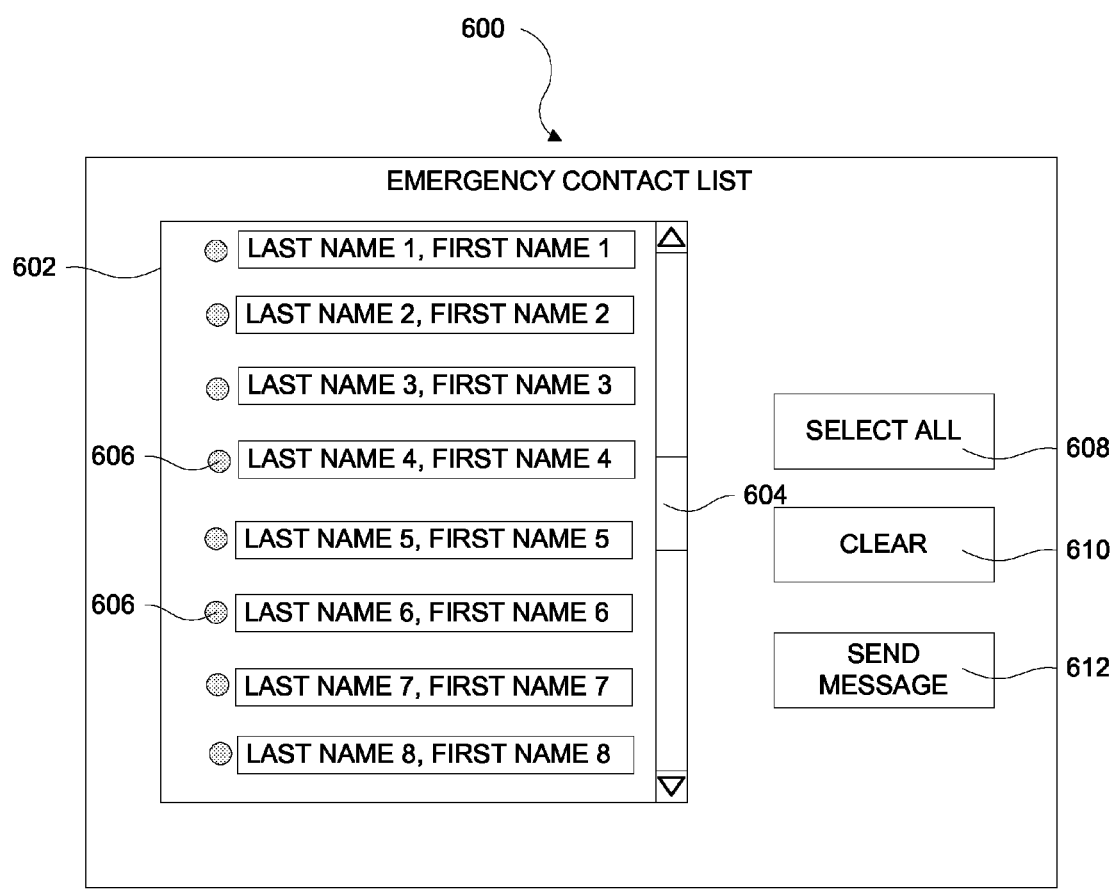
FIG. 6 illustrates an example user interface for selecting individuals to whom a message and/or location request may be transmitted in accordance with aspects described herein.

For instance, FIG. 6 illustrates one example user interface 600 in which a user may select the individuals within the category "emergency contact list" to whom a message and/or location request may be transmitted. Field 602 lists individuals associated with the category selected in field 502 of FIG. 5, for instance, emergency contact list. The list may include a scroll adjustment 604 to display additional users that may not fit in the displayed field. A user may select any number of individuals from the list to receive the message and/or location request being transmitted. Selection of the individuals may be performed by selection of the radio button 606 associated with the desired individual. In other arrangements, the desired individuals may be selected by clicking or double clicking the name of the desired individual, and the like. Interface 600 may also include a select all button 608. Selection of button 608 may select all users within the list in field 602. User interface 600 may also include a clear button 610 which may clear any selection a user has made. Once the individuals are selected to receive the message and/or location request, the user may select the send message button 612 to continue with transmission.

Figure 7:
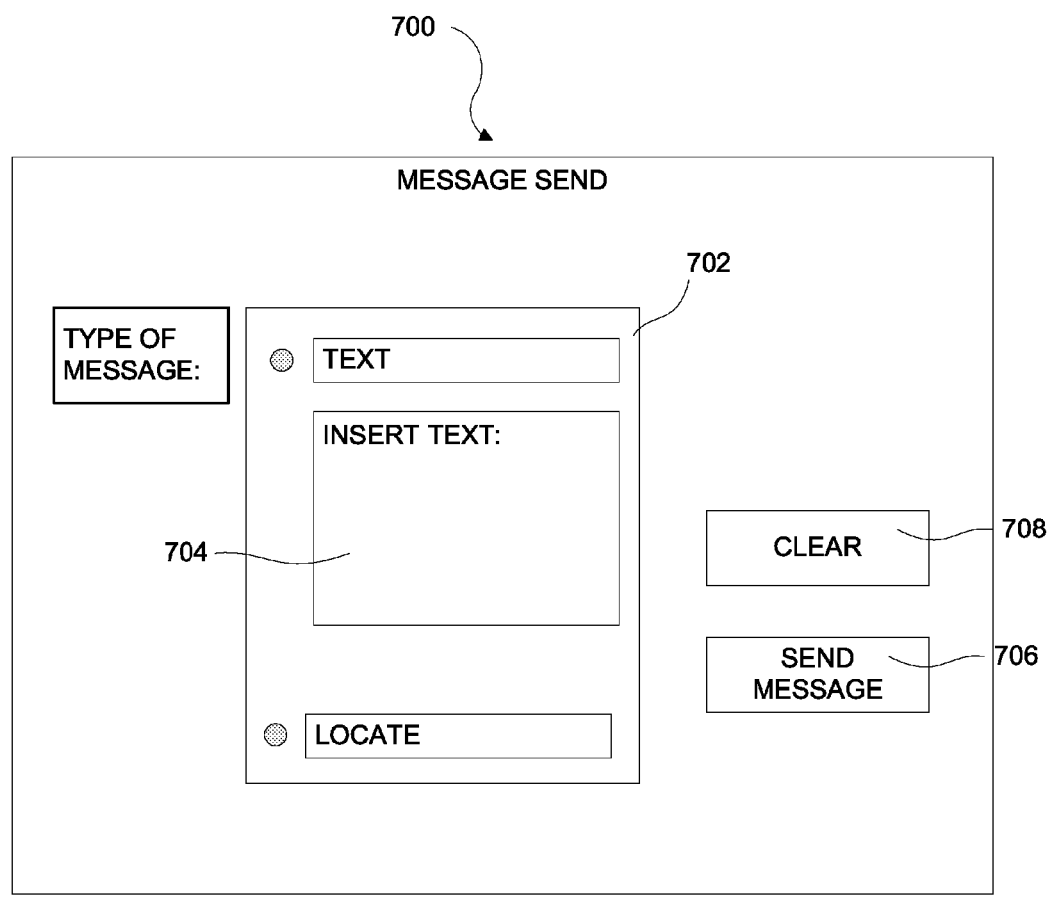
FIG. 7 illustrates an example user interface for selecting a type of transmission to send and sending the transmission in accordance with aspects described herein.

FIG. 7 illustrates one example message send interface 700. The message send interface includes field 702 in which a user may select the type of message to transmit. The user may select transmission of a text based message, such as a SMS message, and/or a transmission of a location request. Selection of the desired type of message may be performed using known methods of selection, such as selection of a radio button associated with the desired selection as shown, clicking or double clicking the desired selection, and the like. If a text based message is selected, the user may input the text of the message to transmit in field 704. Once the desired type of message is selected, the message and/or location request may be transmitted to the receiving mobile devices by selecting send message button 706. In addition, clear button 708 may clear any selection made by the user.

FIG. 8 illustrates one example display showing a location of various emergency contacts and associated mobile devices. The stars 802 indicate the location of the contact. In some arrangements, the name of the contact 804 associated with the star may also be displayed. The map may function in a similar fashion to known internet based maps in which zoom buttons 806 may be used to select a larger or smaller geographic region. In some arrangements, a user may select display of a portion of the received requested locations. In other arrangements the user may display locations received from all requested mobile devices.

The user interfaces described above may generally be implemented on any type of mobile device, such as cellular phones, smart-phones, and the like. Additionally or alternatively, the user interfaces may be implemented on a computer that may wirelessly communicate with other mobile devices via the network arrangements described herein.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
   downloading, by a first mobile device, a predefined contact list, wherein the predefined contact list is an emergency contact list;
   transmitting, from the first mobile device, a request for a location of at least one second mobile device associated with a second individual identified in the predefined contact list, wherein the first mobile device is associated with a first individual identified in the predefined contact list;
   determining, by the first mobile device, that a time stamp associated with the location of the at least one second mobile device predates a time stamp of the request for the location of the at least one second mobile device;
   receiving the location of the at least one second mobile device at the first mobile device;
   storing, on the first mobile device, the received location of the at least one second mobile device; and
   displaying, at the first mobile device, the stored location of the at least one second mobile device.

2. The method of claim 1, wherein the location of the at least one second mobile device corresponds to a location of the second individual associated with the at least one second mobile device.

3. The method of claim 2, wherein the at least one second mobile device includes a plurality of mobile devices associated with individuals on the predefined contact list.

4. The method of claim 1, wherein displaying, at the first mobile device, the stored location of the at least one second mobile device includes displaying the stored location on a geographic map.

5. The method of claim 1, wherein the location of the at least one second mobile device is a location from a global positioning system.

6. The method of claim 1, wherein each of the mobile devices is configured to be substantially equivalent to all other mobile devices.

7. The method of claim 1, wherein the first and at least one second mobile devices include a peer-to-peer location based service application.

8. A method comprising:
   downloading, by a lead mobile device, a predefined contact list, wherein the predefined contact list is an emergency contact list;
   receiving, by a plurality of mobile devices, a request for a location of each of the mobile devices, each of the mobile devices being associated with users identified on the predefined contact list;
   requesting, by the lead mobile device, the location of each of the plurality of mobile devices;
   determining, by the lead mobile device, that a time stamp associated with the location of each of the mobile devices predates a time stamp of the request for the location of each of the mobile devices;
   receiving the location of each of the mobile devices at the lead mobile device, the lead mobile device being associated with a predetermined contact list leader identified in the predefined contact list;
   storing, at the lead mobile device, the received location of each of the plurality of mobile devices; and
   displaying, at the lead mobile device, at least one received location of at least one of the mobile devices.

9. The method of claim 8, wherein the received location of each of the plurality of mobile devices corresponds to a location of the users associated with each of the plurality of mobile device and identified on the predetermined contact list.

10. The method of claim 8, wherein displaying, at the lead mobile device, the at least one received location of at least one of the mobile devices includes displaying the at least one received location on a geographic map.

11. The method of claim 8, wherein the location of each of the plurality of mobile devices includes a location from a global positioning system service.

12. The method of claim 8, wherein each of the plurality of mobile devices is configured to be substantially equivalent to all other mobile devices.

13. The method of claim 8, wherein each of the plurality of mobile devices includes a peer-to-peer location based service application.

14. One or more non-transitory computer-readable media storing computer readable instructions that, when executed, cause at least one computing device to:
   download, at a first mobile device, a predefined contact list, wherein the predefined contact list is an emergency contact list;
   transmit, from the first mobile device, a request for a location of at least one second mobile device associated with a second individual identified in the predefined contact list, wherein the first mobile device is associated with a first individual identified in the predefined contact list;
   determine, by the first mobile device, that a time stamp associated with the location of the at least one second mobile device predates a time stamp of the request for the location of the at least one second mobile device;
   receive the location of the at least one second mobile device at the first mobile device; store, on the first mobile device, the received location;
   display, at the first mobile device, the stored location of the at least one second mobile device.

15. The one or more non-transitory computer-readable media of claim 14, wherein the location of the at least one second mobile device corresponds to a location of the second individual associated with the at least one second mobile device, the individual being identified on the predefined contact list.

16. The one or more non-transitory computer-readable media of claim 15, wherein the at least one second mobile device includes a plurality of mobile devices, each of the plurality of mobile devices being associated with individuals on the predefined contact list.

17. The one or more non-transitory computer-readable media of claim 14, wherein the location of the at least one second mobile device includes a location from a global positioning system.

18. The one or more non-transitory computer-readable media of claim 14, wherein each of the mobile devices is configured to be substantially equivalent to all other mobile devices.

19. The one or more non-transitory computer-readable media of claim 14, wherein the first and second mobile devices include a peer-to-peer location based service application.

20. The method of claim 14, further comprising:

receiving, by the first mobile device, an indication that the time stamp of the location of the at least one second mobile device predates the predetermined threshold time.

21. An apparatus comprising at least one processor; and memory storing computer readable instructions that, when executed by the at least one processor, cause the apparatus to:

- download, by a first mobile device, a predefined contact list, wherein the predefined contact list is an emergency contact list;
- transmit, from the first mobile device, a request for a location of at least one second mobile device associated with a second individual identified in the predefined contact list, wherein the first mobile device is associated with a first individual identified in the predefined contact list;
- determine, by the first mobile device, that a time stamp associated with the location of the at least one second mobile device predates a time stamp of the request for a location of the at least one second mobile device;
- receive the location of the at least one second mobile device at the first mobile device;
- store, on the first mobile device, the received location of the at least one second mobile device;
- display, at the first mobile device, the stored location of the at least one second mobile device.

\* \* \* \* \*